US012696844B2

(12) United States Patent
Bouslog et al.

(10) Patent No.: US 12,696,844 B2
(45) Date of Patent: Aug. 4, 2026

(54) WINDROWER IMPLEMENT WITH MERGER ATTACHMENT

(71) Applicant: DEERE & COMPANY, Moline, IL (US)

(72) Inventors: Tyler J. Bouslog, Ottumwa, IA (US); Benjamin M. Lovett, Ottumwa, IA (US)

(73) Assignee: Deere & Company, Moline, IL (US)

( * ) Notice: Subject to any disclaimer, the term of this patent is extended or adjusted under 35 U.S.C. 154(b) by 609 days.

(21) Appl. No.: 18/157,336

(22) Filed: Jan. 20, 2023

(65) Prior Publication Data

US 2024/0245006 A1 Jul. 25, 2024

(51) Int. Cl.
A01D 57/20 (2006.01)

(52) U.S. Cl.
CPC .................................... A01D 57/20 (2013.01)

(58) Field of Classification Search
CPC ....................................................... A01D 57/20
See application file for complete search history.

(56) References Cited

U.S. PATENT DOCUMENTS

| | | | | |
|---|---|---|---|---|
| 3,205,852 A | * | 9/1965 | Shepard ................ | B60F 3/0015 305/132 |
| 6,415,590 B1 | * | 7/2002 | Lohrentz ................ | A01D 57/20 56/192 |

| | | | | |
|---|---|---|---|---|
| 7,484,349 B2 | | 2/2009 | Talbot et al. | |
| 7,526,908 B1 | | 5/2009 | Rice et al. | |
| 7,624,561 B2 | | 12/2009 | McLean et al. | |
| 7,877,975 B2 | | 2/2011 | McLean et al. | |
| 10,485,173 B2 | | 11/2019 | Nafziger et al. | |
| 2016/0309655 A1 | * | 10/2016 | Treffer ................. | A01D 43/04 |
| 2018/0132420 A1 | * | 5/2018 | Nafziger ............... | A01D 57/20 |
| 2018/0295767 A1 | * | 10/2018 | Friemel ................. | A01B 76/00 |
| 2019/0327897 A1 | * | 10/2019 | McKinnis, Jr. .... | A01D 41/1274 |
| 2020/0339355 A1 | * | 10/2020 | Childs ................... | A01D 87/02 |

FOREIGN PATENT DOCUMENTS

CA 2521187 A1 3/2007

* cited by examiner

*Primary Examiner* — Claude J Brown

(57) ABSTRACT

A merger attachment for a windrower implement includes a support structure extending along a longitudinal structure axis between a first end and a second end. A belt forms an endless loop encircling the support structure. An idler roll is rotatably attached to the support structure proximate the first end thereof and defines an idler diameter. A drive roll is rotatably attached to the support structure proximate the second end thereof and defines a drive diameter. The support structure includes an upper support surface and a lower support surface arranged in a non-parallel relationship relative to each other to define a tapered profile extending along the longitudinal structure axis. The tapered profile has a first thickness at the first end equal to the idler diameter, and increases in thickness toward the second end, which has a second thickness equal to the drive diameter.

19 Claims, 6 Drawing Sheets

WINDROWER IMPLEMENT WITH MERGER ATTACHMENT

TECHNICAL FIELD

The disclosure generally relates to a windrower implement and a merger attachment therefor.

BACKGROUND

A windrower implement gathers crop material and forms the crop material into a swath or windrow. Often, the windrower implement may include a mower head that cuts the crop material and discharges the cut crop material rearward. The windrower implement may include a left and right forming board and a swath board for forming the discharged crop material into the windrow that is typically positioned between a pair of front wheels of the windrower implement, along a generally centerline of the windrower implement. Accordingly, a windrow is formed along the general centerline of the windrower implement with each pass through a field.

The windrower implement may be equipped with a merger attachment for conveying the crop material laterally relative to the centerline of the windrower implement. The merger attachment may be coupled to the belly of the windrower implement immediately rearward of the mower head for receiving the cut crop material discharged therefrom. The merger attachment includes a conveyor belt positioned to rotate in an endless loop generally transverse to the centerline of the windrower implement. The merger implement receives the cut crop material from the mower head, and the conveyor belt moves the crop material laterally relative to the windrower implement to form the windrow at a position that is laterally offset from the centerline of the windrower implement.

An upper or receiving surface of the conveyor belt should be positioned low or close to the ground for receiving the crop material discharged from the mower head. The closer the receiving surface of the conveyor belt is to the ground, the more crop material the conveyor belt may receive and convey or move laterally.

SUMMARY

A windrower implement is provided. The windrower implement includes a frame extending along a central longitudinal axis between a forward end and a rearward end relative to a direction of travel during operation. An implement head is attached to the frame proximate the forward end thereof. The implement head is operable to discharge crop material in a rearward direction generally along the central longitudinal axis of the frame. A merger attachment is coupled to the frame rearward of the implement head. The merger attachment is positioned to receive the discharged crop material from the implement head. The merger attachment is operable to convey crop material laterally relative to the central longitudinal axis. The merger attachment includes a support structure extending along a longitudinal structure axis between a first end and a second end. A belt forms an endless loop encircling the support structure. An idler roll is rotatably attached to the support structure proximate the first end thereof. The idler roll supports the belt at the first end of the support structure. A drive roll is rotatably attached to the support structure proximate the second end thereof. The drive roll supports the belt at the second end of the support structure.

In one aspect of the disclosure, the support structure includes an upper support surface and a lower support surface. The upper support surface is operable to receive the crop material discharged from the head implement. The upper support surface and the lower support surface are arranged in a non-parallel relationship relative to each other to define a tapered profile extending along the longitudinal structure axis.

In one aspect of the disclosure, the first end of the support structure defines a first thickness perpendicular to the longitudinal structure axis. The second end of the support structure defines a second thickness perpendicular to the longitudinal structure axis. The first thickness adjacent the first end of the support structure and the idler roll is less than the second thickness adjacent the second end of the support structure and the drive roll.

In one aspect of the disclosure, the idler roll defines an idler diameter, and the drive roll defines a drive diameter. The idler diameter is less than the drive diameter. Additionally, the idler diameter may be substantially equal to the first thickness of the support structure at the first end thereof. Similarly, the drive diameter may be substantially equal to the second thickness of the support structure at the second end thereof.

In one implementation of the disclosure, the idler diameter and the first thickness may each be between the range of, but are not limited to, one inch (1") and three inches (3"). More particularly, the idler diameter and the first thickness may each be between the range of, but are not limited to, one and three-quarter inches (1¾") and two and one half inches (2½").

In one implementation of the disclosure, the drive diameter and the second thickness may each be between the range of, but are not limited to, two inches (2") and six inches (6"). More particularly, the drive diameter and the second thickness may each be between the range of, but are not limited to, three and one-half inches (3½") and four and one-half inches (4½").

In one aspect of the disclosure, the windrower implement may further include a drive system. The drive system may be coupled to the drive roll. The drive system is operable to rotate the drive roll about a rotation axis of the drive roll for rotating the belt in and endless loop about the drive roll, the support structure, and the idler roll. The drive system may include any device capable of rotating the drive roll. For example, the drive system may include an electric motor, a gear and chain drive coupled to a motor, a hydraulic motor, etc.

Accordingly, the tapered profile of the support structure reduces the height or thickness of the support structure at the first end thereof relative to the second end of the support structure. The first end of the support structure may be positioned to receive the crop material from the implement head. With the reduced thickness of the first end of the support structure, the upper surface of the belt, which receives the crop material from the implement head, may be positioned closer to the ground to improve transfer efficiency of the crop material between the implement head and the merger attachment. The larger second end of the support structure enable the drive roll to have a larger diameter to better and more efficiently engage the belt without slipping.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
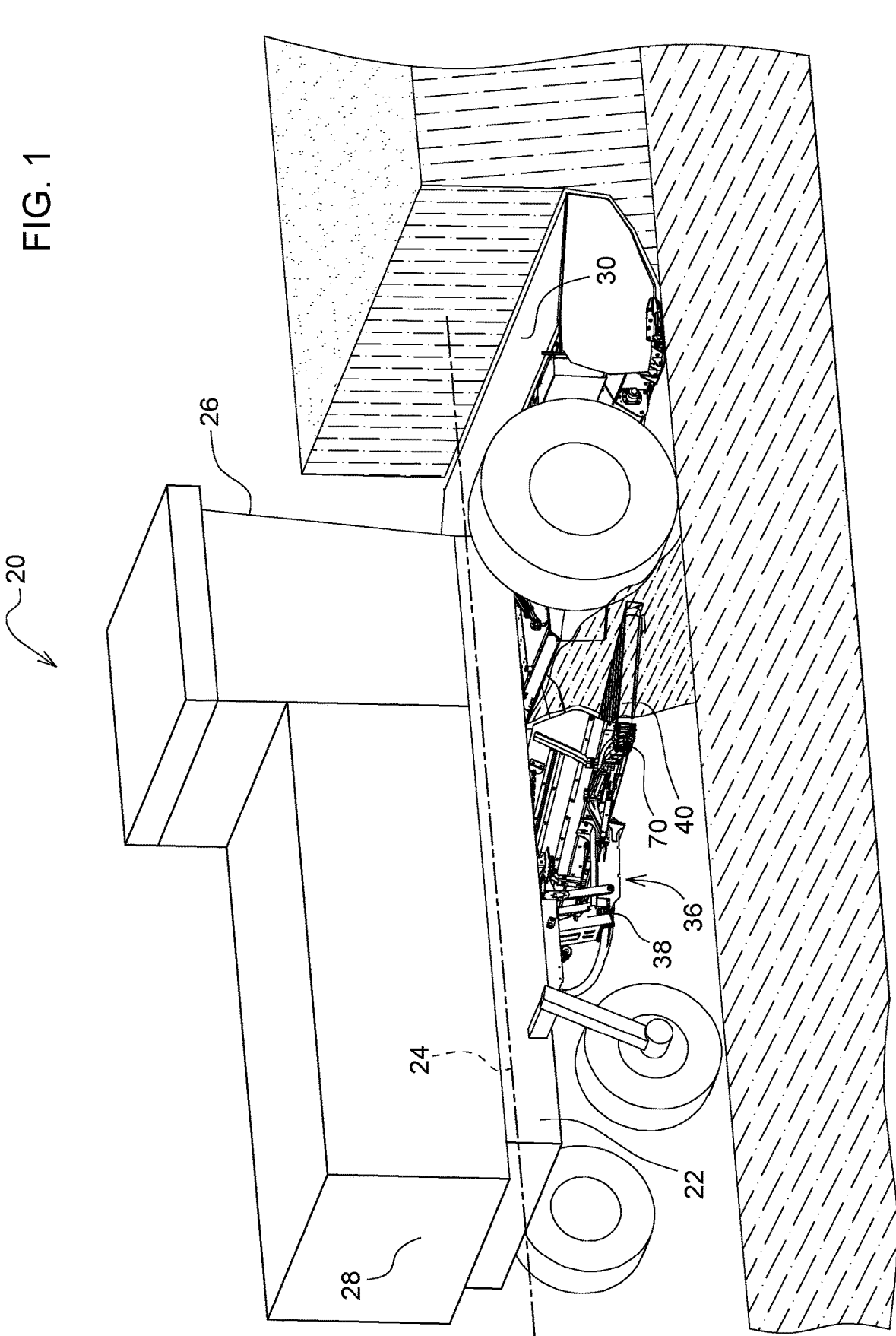
FIG. 1 is a schematic perspective view of a windrower implement.

Referring to the Figures, wherein like numerals indicate like parts throughout the several views, a windrower implement is generally shown at 20 in FIG. 1. The exemplary embodiment of the windrower implement 20 shown in the Figures is configured as a self-propelled windrower. However, it should be appreciated that the teachings of this disclosure may be applied to other platforms, such as but not limited to, a drawn implement configured for connection to a tractor. In one implementation, the windrower implement 20 is operable to mow and collect standing crop material in a field, condition the cut crop material as it moves through the windrower implement 20 to improve is drying characteristics, and then return the conditioned, cut crop material to the field in a windrow or swath.

Figure 2:
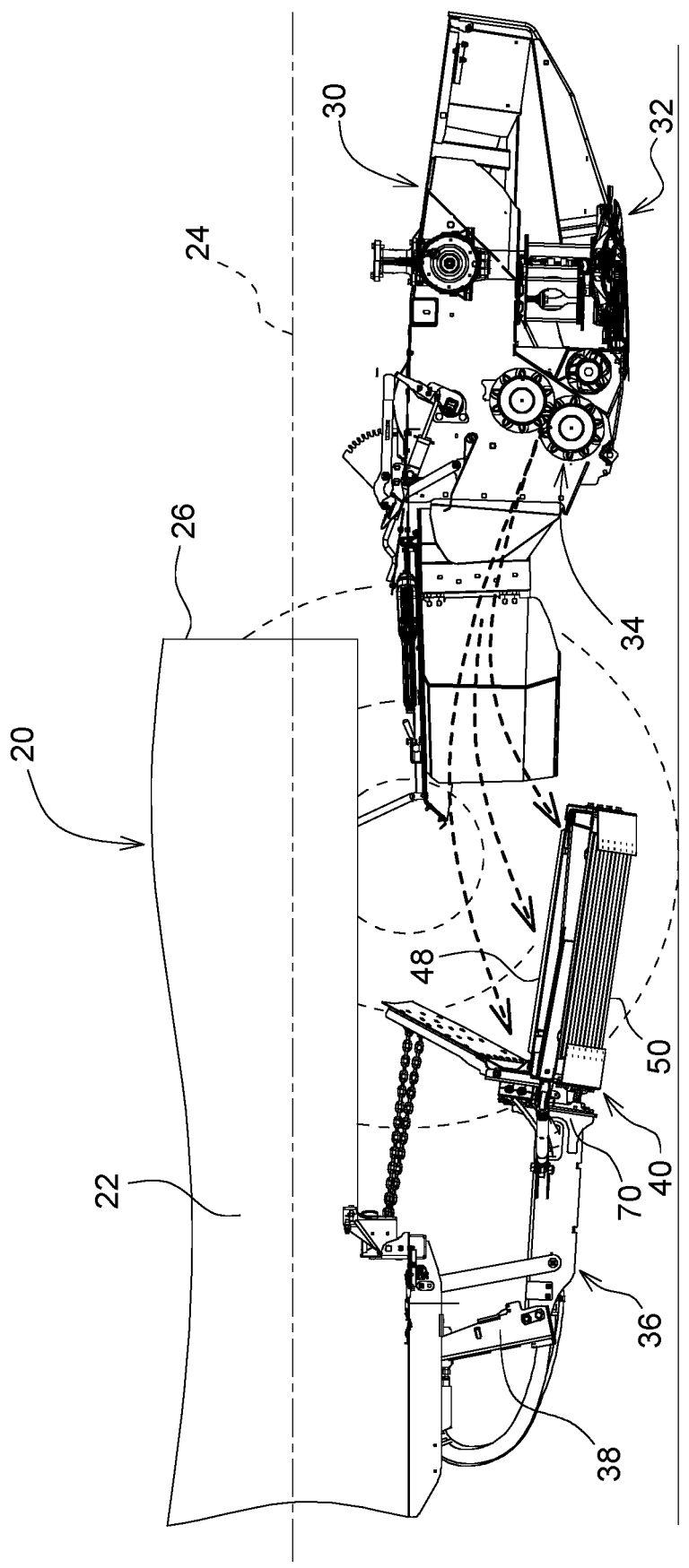
FIG. 2 is a schematic cross-sectional view of the windrower implement.

Referring to FIGS. 1 and 2, the windrower implement 20 includes a frame 22. The frame 22 extends along a central longitudinal axis 24 between a forward end 26 and a rearward end 28 relative to a direction of travel during operation. The frame 22 may include, but is not limited to, the various members, panels, supports, braces, beams, etc., necessary to support the various components and systems of the windrower implement 20 as described below.

The windrower implement 20 further includes an implement head 30. The implement head 30 is attached to the frame 22 proximate the forward end 26 of the frame 22. The implement head 30 is operable to discharge crop material in a rearward direction generally along the central longitudinal axis 24. In addition, the implement head 30 may further cut the crop material and condition the crop material to aid in dry down.

In one implementation, the implement head 30 may include, but is not limited to, a cutting mechanism 32. The cutting mechanism 32 is coupled to the frame 22 and is operable to cut standing crop material in a field. The cutting mechanism 32 may include any mechanism that is capable of cutting the crop material. For example, the cutting mechanism 32 may be embodied as a rotary disc cutter bar. However, the cutting mechanism 32 is not limited to the exemplary embodiment of the rotary disc cutter bar. As such, it should be appreciated that the cutting mechanism 32 may vary from the exemplary embodiment noted herein.

As understood in the art, the rotary disc cutter bar includes a cutter bar supported by the frame 22. The cutter bar extends along an axis that is disposed generally transverse to a direction of travel of the windrower implement 20. The cutter bar includes a plurality of cutting discs spaced along the cutter bar for rotation about respective vertical axes. Each of the cutting discs is coupled to an upright drive shaft to which power is coupled for causing them to rotate in appropriate directions, for delivering cut crop material to an auger disposed rearward of the cutting mechanism 32.

The auger may pass the crop material rearward to a crop conditioning system 34. In particular, the auger may be positioned in front of and lower than the crop conditioning system 34. In operation, the design of the auger enables the delivery of cut crop material into the crop conditioning system 34. The cutting mechanism 32 delivers cut crop material to the auger, which in turn may delivers the cut crop material rearward for further processing by the crop conditioning system 34. The crop conditioning system 34 may include, but is not limited to, an impeller style conditioning system or a pair of counter rotating conditioner rolls, as is understood in the art. The conditioned crop material is expelled rearward by the crop conditioning system 34, and may be formed into a windrow or swath by upright right and left forming boards and a swath board. The cut and conditioned crop material is expelled or discharged from the crop conditioning system 34, whereafter the crop material moves a short distance through the air before accumulating on the ground in the formed windrow.

Figure 3:
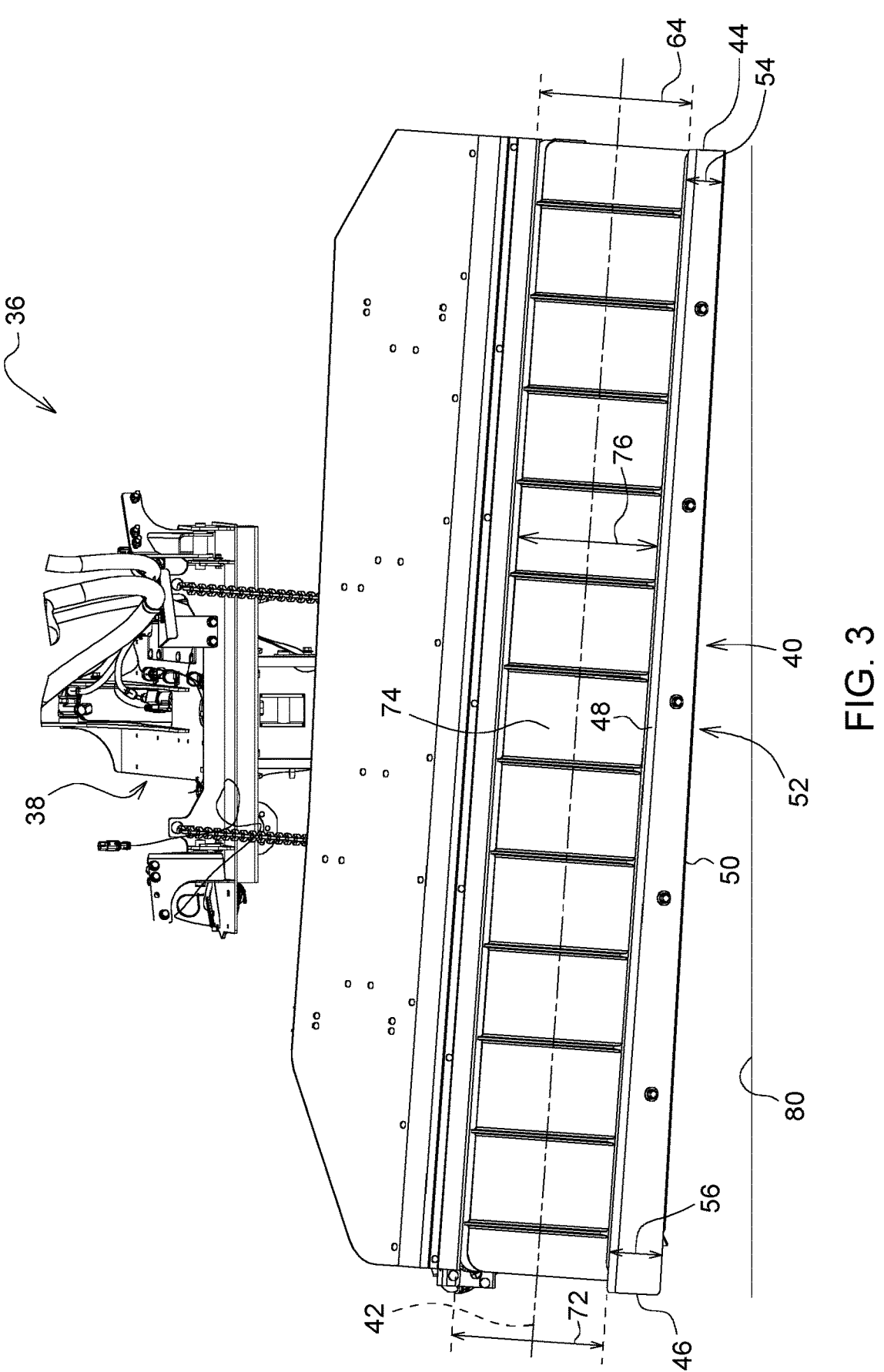
FIG. 3 is a schematic perspective view of a merger attachment for the windrower implement.
Figure 4:
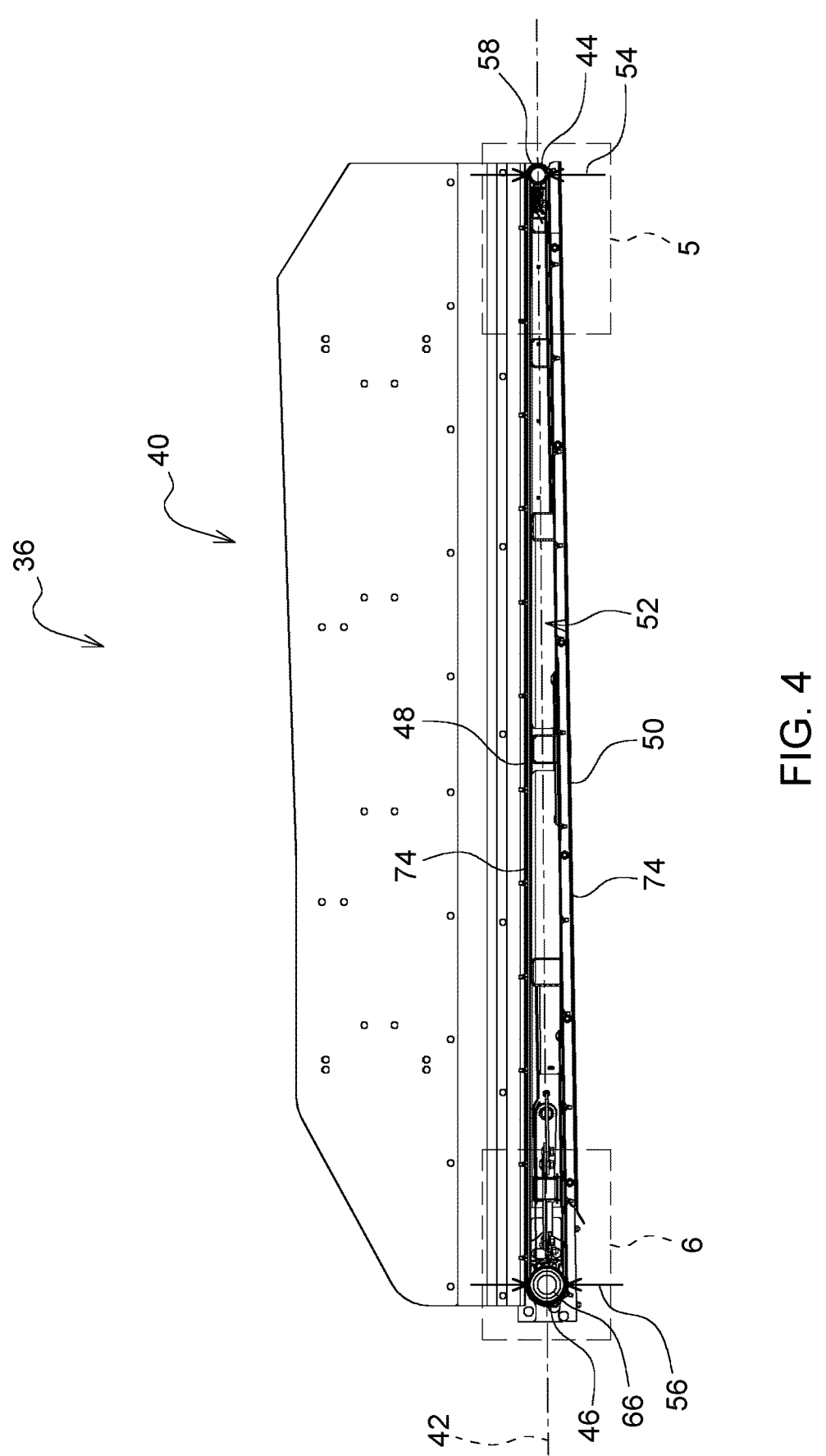
FIG. 4 is a schematic side view of the merger attachment.
Figure 5:
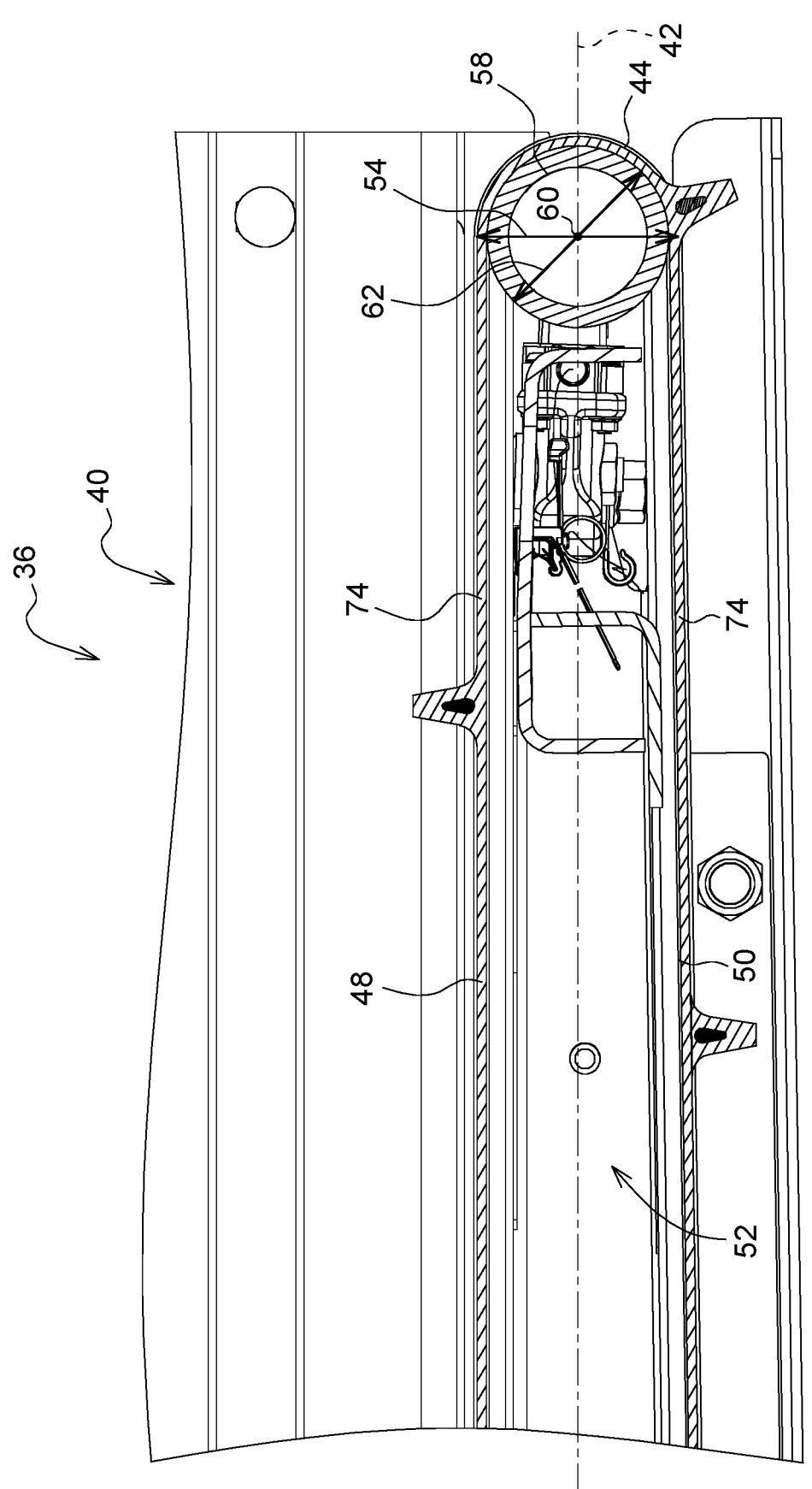
FIG. 5 is a schematic enlarged side view of an idler roll of the merger attachment.
Figure 6:
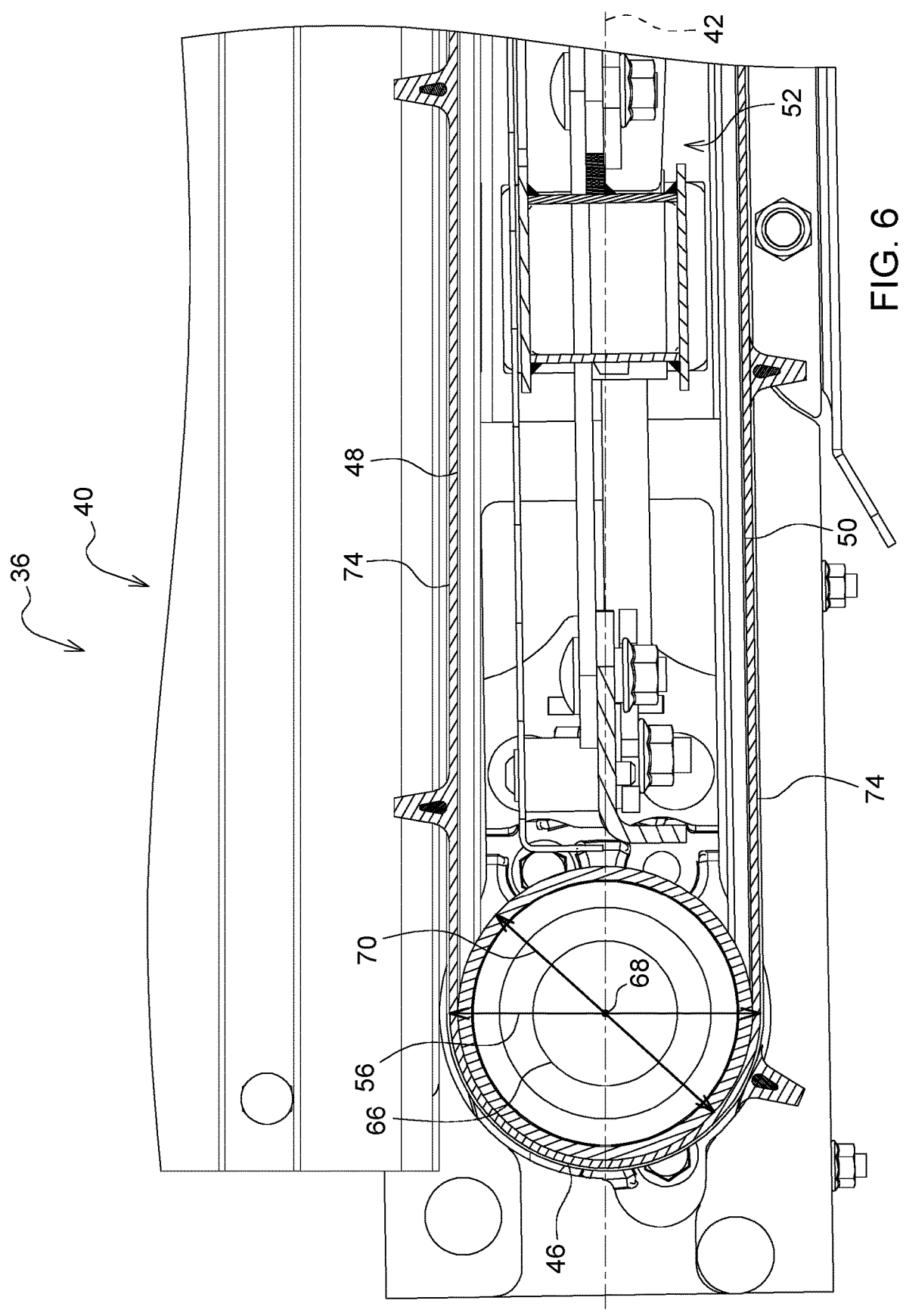
FIG. 6 is a schematic enlarged side view of a drive roll of the merger attachment.

Referring to FIGS. 1-3, the windrower implement 20 may include a merger attachment 36. The merger attachment 36 is coupled to the frame 22 rearward of the implement head 30 and positioned to receive the discharged crop material from the implement head 30. The merger attachment 36 may be positioned such that the crop material discharged from the crop conditioning system 34 falls on the merger attachment 36 instead of the ground. The merger attachment 36 is operable to convey the crop material laterally relative to the central longitudinal axis 24, and deposit the crop material on the ground at a laterally offset position relative to the central longitudinal axis 24 of the frame 22.

The merger attachment 36 may include a lift structure 38 and a support structure 40. The lift structure 38 may interconnect the frame 22 of the windrower implement 20 and the support structure 40. The lift structure 38 may be configured to selectively position the support structure 40 in a stowed position and a deployed position. When disposed in the stowed position, the lift structure 38 may position the support structure 40 tightly against the belly of the frame 22, such that the support structure 40 does not engage the cut crop material and the windrow may be formed along the central longitudinal axis 24 of the frame 22. When disposed in the deployed position, the lift structure 38 may position the support structure 40 near the ground surface 80, such that the crop material falls on the support structure 40 for lateral movement relative to the central longitudinal axis 24, whereby the windrow may be formed laterally offset from the central longitudinal axis 24. The features, components, structure, and operation of the lift structure 38 are understood by those skilled in the art, are not pertinent to the teachings of this disclosure, and are therefore not described in detail herein.

Referring to FIGS. 3-6, the support structure 40 extends along a longitudinal structure axis 42 between a first end 44 and a second end 46. As used herein, the first end 44 may be considered an inboard end at which the crop material discharged from the crop conditioning system 34 may land. As such, the first end 44 or the inboard end is positioned proximate the central longitudinal axis 24 of the frame 22. As used herein, the second end 46 may be considered and outboard end from which the crop material is discharged from the merger attachment 36 at the laterally offset position. As such, the second end 46 or the outboard end is positioned farther from the central longitudinal axis 24 than the first end 44 or the inboard end.

The support structure 40 includes an upper support surface 48 and an opposing lower support surface 50. Both the upper support surface 48 and the lower support surface 50 extend between the first end 44 and the second end 46 of the support structure 40. The upper support surface 48 is disposed vertically above the lower support surface 50 relative to the ground surface 80.

The upper support surface 48 and the lower support surface 50 are arranged in a non-parallel relationship relative to each other to define a tapered profile 52 along the longitudinal structure axis 42. The tapered profile 52 may be considered the side profile of the support structure 40 that extends perpendicularly relative to the upper support surface 48 and the lower support surface 50.

The tapered profile 52 of the support structure 40 includes the first end 44 of the support structure 40 defining a first thickness 54. The first thickness 54 is the thickness or height of the support structure 40 at the first end 44 thereof measured perpendicular to the longitudinal structure axis 42. The tapered profile 52 of the support structure 40 includes the second end 46 of the support structure 40 defining a second thickness 56. The second thickness 56 is the thickness or height of the support structure 40 at the second end 46 thereof measured perpendicular to the longitudinal structure axis 42. The first thickness 54 is less than the second thickness 56. Stated contrastly, the second thickness 56 is greater than the first thickness 54. In the implementation shown in the Figures and described herein, the thickness of the support structure 40 increases continuously from the first end 44 toward the second end 46. The rate of increase in the thickness of the support structure 40 along the longitudinal structure axis 42 may be constant, such as shown in the figures, or may be variable.

The support structure 40 includes an idler roll 58 rotatably attached to the support structure 40 proximate the first end 44 of the support structure 40. The idler roll 58 is rotatable about a respective idler axis 60. The idler roll 58 may include a cylindrical shape defining an idler diameter 62 and extending a roll length 64. The idler roll 58 may be attached to the support structure 40 in a manner that enables rotation about the idler axis 60, and may include backets, bolts, fasteners, etc. The idler roll 58 extends perpendicular relative to the longitudinal structure axis 42, between the sides or edges of the support structure 40, and generally parallel with the upper support surface 48 and the lower support surface 50.

The support structure 40 includes a drive roll 66 rotatably attached to the support structure 40 proximate the second end 46 of the support structure 40. The drive roll 66 is rotatable about a respective drive axis 68. The drive roll 66 may include a cylindrical shape defining a drive diameter 70 and extending a roll length 72. The drive roll 66 may be attached to the support structure 40 in a manner that enables rotation about the drive axis 68, and may include backets, bolts, fasteners, etc. The drive roll 66 extends perpendicular relative to the longitudinal structure axis 42, between the sides or edges of the support structure 40, and generally parallel with the upper support surface 48 and the lower support surface 50. The drive roll 66 is parallel with the idler roll 58.

The merger attachment 36 further includes a continuous conveyor belt 74. The belt 74 forms an endless loop encircling the support structure 40, the idler roll 58, and the drive roll 66. The belt 74 includes a belt width 76 that is approximately equal to the roll width of the idler roll 58 and the roll width of the drive roll 66. As used herein, the term "continuous belt 74" or "belt 74" should be understood to include an endless loop of flexible construction extending between and encircling two rotating shafts, pulleys, or rolls, i.e., the idler roll 58, the drive roll 66 and the support structure 40 in between. The idler roll 58 and the drive roll 66 support the belt 74 at the first end 44 and the second end 46 of the support structure 40 respectively. The upper support surface 48 of the support structure 40 supports an upper run of the belt 74, and the lower support surface 50 of the support structure 40 supports a lower run of the belt 74. It should be appreciated that the crop material discharged from the crop conditioning system 34 may fall on the upper run of the belt 74, supported by the upper support surface 48 of the support structure 40. The belt 74 is operable to rotate about the idler roll 58 and the drive roll 66 in a continuous, uninterrupted cyclical manner when engaged.

The belt 74 may be manufactured from, but is not limited to, a single piece of material, or from multiple segments pinned or otherwise connected together. The material of the belt 74 may include, but is not limited to, a rubber or rubber like material, a polymer material, a reinforced polymer or rubber material, a metal material, etc.

The merger attachment 36 further includes a drive system 78. The drive system 78 is coupled to the drive roll 66 and operable to rotate the drive roll 66 about the drive axis 68. Frictional or mechanical interaction between the drive roll 66 and the belt 74 causes the belt 74 to rotate in the cyclical manner about the support structure 40. As such, rotation of the drive roll 66 rotates the belt 74 in the endless loop about the drive roll 66, the support structure 40, and the idler roll 58. The drive system 78 may include any device capable of rotating the drive roll 66. For example, the drive system 78 may include, but is not limited to, an electric motor operable to generate torque, a hydraulic motor operable to generate torque, a gear and chain drive coupled to a motor to transmitting torque between the drive roll 66 and the motor, electrical controls, etc. The specific components, features and operation of the drive system 78 are not pertinent to the teachings of this disclosure, and are therefore not described in greater detail herein.

As described above, the idler roll 58 defines the idler diameter 62, and the drive roll 66 defines the drive diameter 70. In the implementation shown in the Figures and described herein, the drive diameter 70 is larger than the idler diameter 62. Stated in contrast, the idler diameter 62 is less than the drive diameter 70. While the example implementation shown in the figures and described herein shows the drive roll 66 configured as a single roll element, it should be appreciated that in other implementations, the drive roll 66 may be comprised of several smaller rolls arranged in a circular or semi-circular arrangement to define the drive roll 66 and the drive diameter 70.

In the example implementation shown in the Figures and described herein, the idler diameter 62 of the idler roll 58 is substantially equal to the first thickness 54 of the first end 44 of the support structure 40. As used herein, the first thickness 54 of the first end 44 of the support structure 40 and the idler diameter 62 may be considered to be "substantially equal" when the first thickness 54 and the idler diameter 62 differ in size by less than fifteen percent (15%). While the example implementation shown in the Figures and described herein shows the first thickness 54 and the idler diameter 62 substantially equal in size, it should be appreciated that in other implementations, the first thickness 54 and the idler diameter 62 may not be substantially equal.

In the example implementation described herein, the idler diameter 62 and the first thickness 54 may each be between the range of one inch (1") and three inches (3"). More particularly, the idler diameter 62 and the first thickness 54 may each be between the range of one and three-quarter inches (1¾") and two and one-half inches (2½"). It should be appreciated that in other implementations, the values of the first thickness 54 and the idler diameter 62 may differ from the example ranges described herein.

In the example implementation shown in the Figures and described herein, the drive diameter 70 of the drive roll 66 is substantially equal to the second thickness 56 of the second end 46 of the support structure 40. As used herein, the second thickness 56 of the second end 46 of the support structure 40 and the drive diameter 70 may be considered to be "substantially equal" when the second thickness 56 and the drive diameter 70 differ in size by less than fifteen percent (15%). While the example implementation shown in the Figures and described herein shows the second thickness 56 and the drive diameter 70 substantially equal in size, it should be appreciated that in other implementations, the second thickness 56 and the drive diameter 70 may not be substantially equal.

In the example implementation described herein, the drive diameter 70 and the second thickness 56 may each be between the range of two inches (2") and six inches (6"). More particularly, the drive diameter 70 and the second thickness 56 may each be between the range of three and one-half inches (3½") and four and one-half inches (4½"). It should be appreciated that in other implementations, the values of the second thickness 56 and the drive diameter 70 may differ from the example ranges described herein.

While the example ranges of the values of the first thickness 54 and the idler diameter 62 and the example ranges of the values of the second thickness 56 and the drive diameter 70 described above overlap, it should be appreciated that the respective values of the drive diameter 70 and the second thickness 56 may include any value within the range described above so long as the values are greater than the respective values of the idler diameter 62 and the first thickness 54. Similarly, it should be appreciated that the respective values of the idler diameter 62 and the first thickness 54 may include any value within the range described above so long as the values are less than the respective values of the drive diameter 70 and the second thickness 56.

The tapered profile 52 described above, in which the first thickness 54 of the first end 44 of the support structure 40 is less than the second thickness 56 of the second end 46 of the support structure 40, reduces the height of the support structure 40 adjacent the inboard end of the support structure 40, where the crop material is deposited onto the belt 74 from the crop conditioning system 34. The reduced height of the support structure 40 at the first end 44 thereof enables the upper support surface 48 and the belt 74 disposed thereon to be positioned nearer the ground surface 80, which increases the amount of the crop material that may be transferred onto the belt 74, thereby minimizing or reducing the amount of the crop material that may fall short of the belt 74. Additionally, the larger drive diameter 70 of the drive roll 66 enables the drive roll 66 to be sized to generate enough friction against the belt 74 to move the belt 74 without slippage.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrower implement comprising:

a frame extending along a central longitudinal axis between a forward end and a rearward end relative to a direction of travel during operation;

an implement head attached to the forward end of the frame, wherein the implement head is operable to discharge crop material in a rearward direction generally along the central longitudinal axis;

a merger attachment coupled to the frame rearward of the implement head and positioned to receive discharged crop material from the implement head, wherein the merger attachment is operable to convey crop material laterally relative to the central longitudinal axis, the merger attachment including:

a support structure extending along a longitudinal structure axis between a first end and a second end, wherein the first end is positioned for receiving crop material from the implement head, and the second end is disposed outboard of the first end for discharging the crop material from the merger attachment;

a belt forming an endless loop encircling the support structure;

an idler roll rotatably attached to the support structure at the first end thereof and supporting the belt, wherein the idler roll defines an idler diameter;

a drive roll rotatably attached to the support structure at the second end thereof and supporting the belt, wherein the drive roll defines a drive diameter;

a drive system coupled to the drive roll and operable to rotate the drive roll about a rotation axis thereof for rotating the belt in and endless loop about the drive roll, the support structure, and the idler roll; and wherein the idler diameter is less than the drive diameter.

2. The windrower implement set forth in claim 1, wherein the first end of the support structure defines a first thickness between the range of one inch and three inches.

3. The windrower implement set forth in claim 2, wherein the first thickness is between the range of one and three-quarter inches and two and one-half inches.

4. The windrower implement set forth in claim 2, wherein the first thickness and the idler diameter are substantially equal.

5. The windrower implement set forth in claim 1, wherein the second end of the support structure defines a second thickness between the range of two inches and six inches.

6. The windrower implement set forth in claim 5, wherein the second thickness is between the range of three and one-half inches and four and one-half inches.

7. The windrower implement set forth in claim 5, wherein the second thickness and the drive diameter are substantially equal.

8. The windrower implement set forth in claim 1, wherein the support structure includes an upper support surface and a lower support surface arranged in a non-parallel relationship relative to each other to define a tapered profile extending along the longitudinal structure axis.

9. A windrower implement comprising:

a frame extending along a central longitudinal axis between a forward end and a rearward end relative to a direction of travel during operation;

an implement head attached to the forward end of the frame, wherein the implement head is operable to discharge crop material in a rearward direction generally along the central longitudinal axis;

a merger attachment coupled to the frame rearward of the implement head and positioned to receive discharged crop material from the implement head, wherein the merger attachment is operable to convey crop material laterally relative to the central longitudinal axis, the merger attachment including:

a support structure extending along a longitudinal structure axis between a first end and a second end, wherein the first end is positioned for receiving crop material from the implement head, and the second end is disposed outboard of the first end for discharging the crop material from the merger attachment;

a belt forming an endless loop encircling the support structure;

an idler roll rotatably attached to the support structure at the first end thereof and supporting the belt;

a drive roll rotatably attached to the support structure at the second end thereof and supporting the belt;

a drive system coupled to the drive roll and operable to rotate the drive roll about a rotation axis thereof for rotating the belt in and endless loop about the drive roll, the support structure, and the idler roll; and wherein the support structure includes an upper support surface and a lower support surface extending between the first end and the second end and arranged in a non-parallel relationship relative to each other to define a tapered profile along the longitudinal structure axis, wherein the tapered profile is narrower at the first end of the support structure and wider at the second end of the support structure.

10. The windrower implement set forth in claim 9, wherein the first end of the support structure defines a first thickness, and wherein the second end of the support structure defines a second thickness, with the first thickness less than the second thickness.

11. The windrower implement set forth in claim 10, wherein the idler roll defines an idler diameter.

12. The windrower implement set forth in claim 11, wherein the drive roll defines a drive diameter.

13. The windrower implement set forth in claim 12, wherein the drive diameter is larger than the idler diameter.

14. The windrower implement set forth in claim 12, wherein the drive diameter is substantially equal to the second thickness of the second end of the support structure, and wherein the idler diameter is substantially equal to the first thickness of the first end of the support structure.

15. A merger attachment for a windrower implement, the merger attachment comprising:

a support structure extending along a longitudinal structure axis between a first end and a second end, wherein the first end is positioned for receiving crop material from the implement head, and the second end is disposed outboard of the first end for discharging the crop material from the merger attachment;

a belt forming an endless loop encircling the support structure;

an idler roll rotatably attached to the support structure at the first end thereof and supporting the belt;

a drive roll rotatably attached to the support structure at the second end thereof and supporting the belt;

a drive system coupled to the drive roll and operable to rotate the drive roll about a rotation axis thereof for rotating the belt in and endless loop about the drive roll, the support structure, and the idler roll; and wherein the support structure includes an upper support surface and a lower support surface extending between the first end and the second end and arranged in a non-parallel relationship relative to each other to define a tapered profile along the longitudinal structure axis, wherein the tapered profile is narrower at the first end of the support structure and wider at the second end of the support structure.

16. The merger attachment set forth in claim 15, wherein the first end of the support structure defines a first thickness, and wherein the second end of the support structure defines a second thickness, with the second thickness greater than the first thickness.

17. The merger attachment set forth in claim 16, wherein the idler roll defines an idler diameter.

18. The merger attachment set forth in claim 17, wherein the drive roll defines a drive diameter that is greater than the idler diameter.

19. The merger attachment set forth in claim 18, wherein the drive diameter is substantially equal to the second thickness of the second end of the support structure, and wherein the idler diameter is substantially equal to the first thickness of the first end of the support structure.

* * * * *